(12) United States Patent
Pantelidou et al.

(10) Patent No.: US 11,516,708 B1
(45) Date of Patent: Nov. 29, 2022

(54) INFORMATION EXCHANGE THROUGH THE INTERFACES FOR ML-BASED CHO

(71) Applicant: Nokia Technologies Oy, Espoo (FI)

(72) Inventors: Anna Pantelidou, Massy (FR); Ingo Viering, Munich (DE); Krzysztof Kordybach, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 20 days.

(21) Appl. No.: 17/313,381

(22) Filed: May 6, 2021

(51) Int. Cl.
*H04W 36/00* (2009.01)
*H04W 36/08* (2009.01)

(52) U.S. Cl.
CPC ... *H04W 36/0016* (2013.01); *H04W 36/0072* (2013.01); *H04W 36/0083* (2013.01); *H04W 36/08* (2013.01)

(58) Field of Classification Search
CPC ......... H04W 36/0016; H04W 36/0072; H04W 36/0083; H04W 36/08
See application file for complete search history.

(56) References Cited

FOREIGN PATENT DOCUMENTS

WO    WO-2020122797 A1 *  6/2020

OTHER PUBLICATIONS

Ericsson "AI/ML Based Use Cases" 3GPP TSG WG3 Meeting #110-e R3-206437.Online Meeting, Nov. 2-12, 2020.
CMCC "Revised SID: Study on Enhancement for Data Collection for NR and ENDC" 3GPP TSG Ran Meeting #89e RP-201620. Electronic Meeting, Sep. 14-18, 2020.

* cited by examiner

*Primary Examiner* — Nam T Huynh
(74) *Attorney, Agent, or Firm* — Joseph C. Drish; Harrington & Smith

(57) ABSTRACT

An apparatus includes circuitry configured to: initiate a conditional handover preparation for a conditional handover to change communication access for a user equipment from a source node to a target node; receive a cost from the target node following the conditional handover preparation; receive a cause indicating a trigger for sending the cost, an indication of a type of the cost, and a range for the cost, where the cause characterizes a value of the cost to indicate the type of the cost; the cost being based on resource utilization of the target node, the resource utilization being related to providing communication access for the user equipment following the conditional handover preparation; and adjust a policy related to an initiation of a subsequent conditional handover preparation for the user equipment to the target node, the policy adjusted based on the cost to enhance the resource utilization of the target node.

51 Claims, 7 Drawing Sheets

US 11,516,708 B1

INFORMATION EXCHANGE THROUGH THE INTERFACES FOR ML-BASED CHO

TECHNICAL FIELD

The examples and non-limiting embodiments relate generally to communications and, more particularly, to information exchange through the interfaces for ML-based CHO.

BACKGROUND

It is known to implement a handover in a communication network.

SUMMARY

In accordance with an aspect, an apparatus includes at least one processor; and at least one non-transitory memory including computer program code; wherein the at least one memory and the computer program code are configured to, with the at least one processor, cause the apparatus at least to: initiate a conditional handover preparation for a conditional handover to change communication access for at least one user equipment from a source radio node to at least one target radio node; receive a cost from the at least one target radio node following the conditional handover preparation; receive a cause indicating a trigger for sending the cost, an indication of a type of the cost, and a range for the cost, where the cause characterizes a value of the cost to indicate the type of the cost; wherein the cost is based on resource utilization of the at least one target radio node, the resource utilization being related to providing communication access for the at least one user equipment following the conditional handover preparation; and adjust a policy related to an initiation of a subsequent conditional handover preparation for the at least one user equipment to the at least one target radio node, the policy being adjusted based on the received cost to enhance the resource utilization of the at least one target radio node.

In accordance with an aspect, an apparatus includes at least one processor; and at least one non-transitory memory including computer program code; wherein the at least one memory and the computer program code are configured to, with the at least one processor, cause the apparatus at least to: receive an initiation of a conditional handover preparation for a conditional handover to change communication access for the at least one user equipment from a source radio node to a target radio node; determine a cost based on resource utilization of the target radio node, the resource utilization being related to providing communication access for at least one user equipment following the conditional handover preparation; send the cost to the source radio node or a network element following the conditional handover preparation, the cost providing information to enhance the resource utilization of the target radio node; and send a cause indicating a trigger for sending the cost, an indication of a type of the cost, and a range for the cost, where the cause characterizes a value of the cost to indicate the type of the cost.

In accordance with an aspect, a method includes initiating a conditional handover preparation for a conditional handover to change communication access for at least one user equipment from a source radio node to at least one target radio node; receiving a cost from the at least one target radio node following the conditional handover preparation; receiving a cause indicating a trigger for sending the cost, an indication of a type of the cost, and a range for the cost, where the cause characterizes a value of the cost to indicate the type of the cost; wherein the cost is based on resource utilization of the at least one target radio node, the resource utilization being related to providing communication access for the at least one user equipment following the conditional handover preparation; and adjusting a policy related to an initiation of a subsequent conditional handover preparation for the at least one user equipment to the at least one target radio node, the policy being adjusted based on the received cost to enhance the resource utilization of the at least one target radio node.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
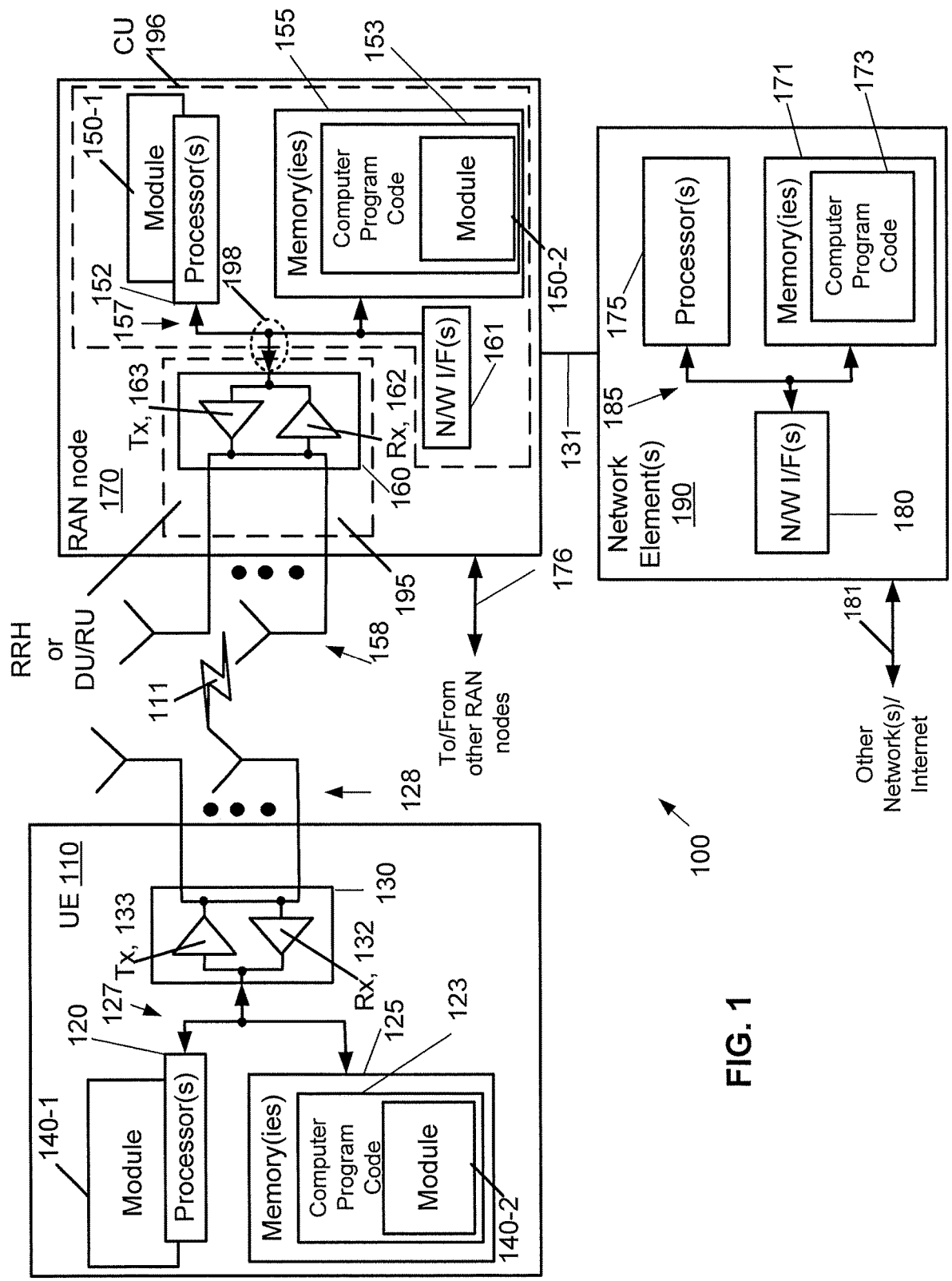
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including information exchange through the interfaces for ML-based CHO. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein. Computer program code 173 and other elements/features shown in FIG. 1 of network element(s) 190 may be configured to implement network element related aspects of the methods described herein, such as OAM.

Having thus introduced a suitable but non-limiting technical context for the practice of the example embodiments, the example embodiments are now described with greater specificity.

The examples described herein are related to a conditional handover (CHO) procedure, and provide an improved procedure involving measurement/feedback information on occurred CHO procedures. The improved feedback allows for better CHO requests/decisions in the future. The feedback information is evaluated by artificial intelligence (AI)/machine learning (ML) algorithms. The examples described herein provide a basic procedure for feedback information, but the benefit lies in the evaluation of feedback information as input to the next CHO.

Introduction of AI/ML (artificial intelligence/machine learning) in the RAN is currently studied in 3GPP RAN3 (study item description (SID) in RP-201620). As per the SID, artificial intelligence (AI) including machine learning (ML) algorithms are considered to provide a powerful tool to help operators to improve the network management and the user experience by providing insights based on autonomous analysis and processing of collected data.

The study focuses on the current NG-RAN architecture and interfaces to enable AI support for 5G deployments. Even though NG-RAN is a distributed architecture, with peer NG-RAN nodes operating without central control, it is still expected that for some use cases OAM control (corresponding to a centralized node) is considered.

Additionally, the following detailed study item objectives are part of the objectives of the SI (RP-201620): study high level principles for RAN intelligence enabled by AI, the functional framework (e.g. the AI functionality and the input/output of the components for AI enabled optimization) and identify the benefits of AI enabled NG-RAN through possible use cases e.g. energy saving, load balancing, mobility management, coverage optimization, etc. In addition:

a) Study standardization impacts for the identified use cases including the data that may be needed by an AI function as input and data that may be produced by an AI function as output, which is interpretable for multi-vendor support.

b) Study standardization impacts on the node or function in the current NG-RAN architecture to receive/provide the input/output data.

c) Study standardization impacts on the network interface(s) to convey the input/output data among network nodes or AI functions.

The current RAN3 discussion status relative to use cases is reflected by the following agreement (November 2020): "—As a starting point, focus on at least the following use cases: Energy saving, load balancing, traffic steering/mobility optimization (other use cases, e.g. optimization of physical layer parameters, are not precluded)."

Conditional handover (CHO) is a similar handover mechanism like normal handover with the difference that the time when the handover is performed is decided by the UE. In CHO, the gNB configures an event at the UE which triggers the UE to send a measurement report to the gNB. The gNB, based on the measurement report, prepares one or more possible target gNBs (also called candidate target gNBs). Furthermore, even though in normal handover a UE immediately accesses the target cell, in CHO the source additionally configures a UE with one or more CHO conditions. Conditions are evaluated at the UE from the moment that a CHO configuration is received by the network. Evaluation stops when handover is executed to another cell. Therefore, the UE accesses the target cell when the CHO execution condition is met. One of the main advantages of CHO is that the handover command can be sent very early to the UE, when the UE is still well inside the coverage of the source cell. This makes it more robust in the sense that the risk that the UE loses coverage to the cell before it receives the handover command is minimized.

However, this benefit of CHO comes at the cost that the reserved resources can be much higher and maintained much longer. This is due to the fact that the prepared candidate target cells may comprise a large number. Additionally, CHO is typically configured very early (to achieve robustness). Since the time when the configured execution condition at the UE is met is random and unknown a priori, the reserved resources at each candidate target cell are reserved longer than in a normal handover.

Figure 2:
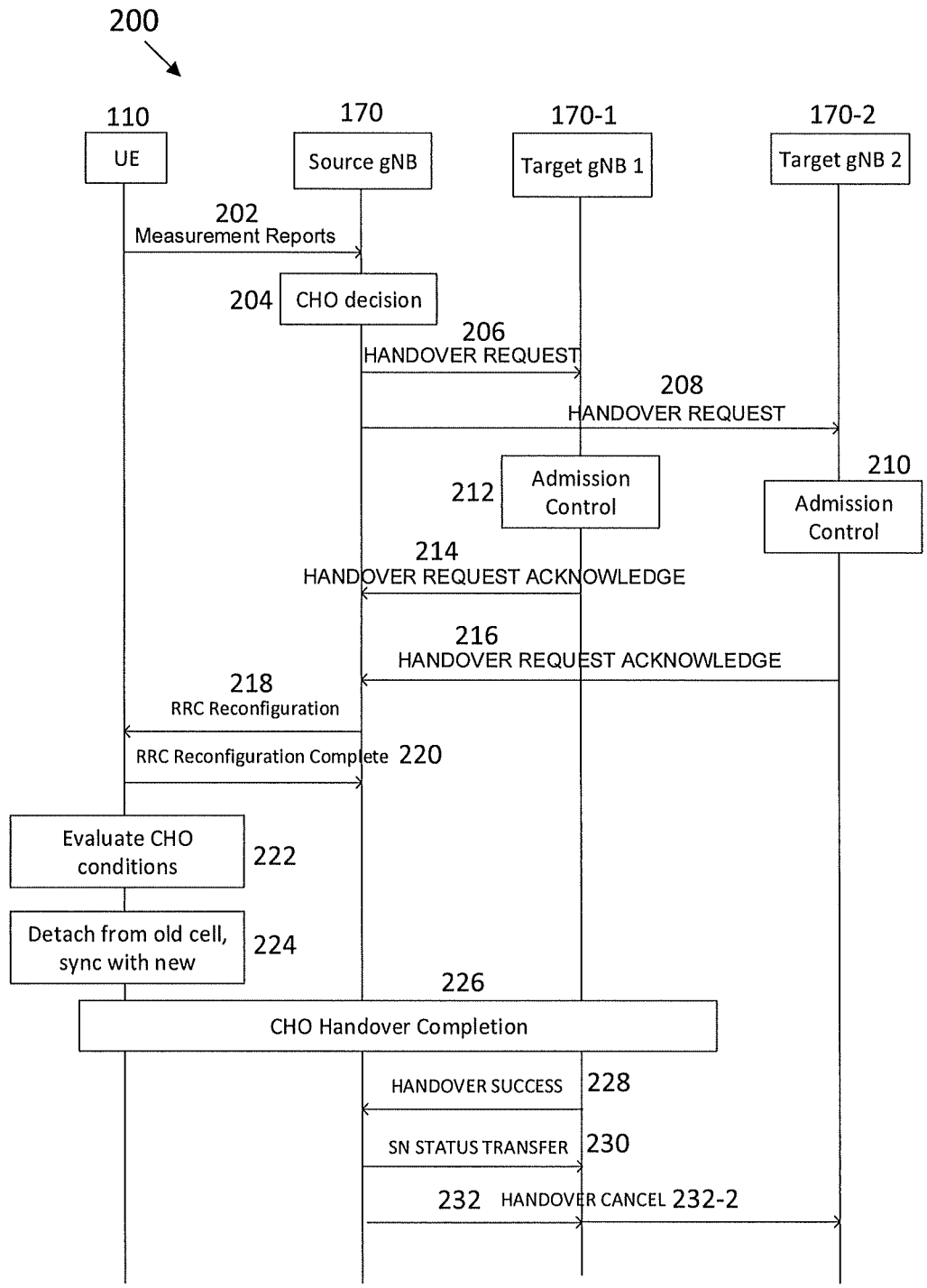
FIG. 2 illustrates an example conditional handover procedure.

FIG. 2 summarizes an example conditional handover procedure 200. It should be highlighted, that in this example figure, namely FIG. 2, the handover is finally executed towards target gNB 1 170-1 (refer to item 226), and the source gNB 170 cancels the (conditional) handover in target gNB 2 170-2 (refer to item 232-2). Hence, gNB 2 170-2 was prepared in vain in this case, and target gNB 1 170-1 may have been prepared unnecessarily early.

As further shown in FIG. 2, the UE 110 sends one or more measurement report(s) to the source gNB 170. The source gNB 170 makes a CHO decision 204 based on the measurement report(s), and sends a handover request 206 to the target gNB 1 170-1, as well as a handover request 208 to the target gNB 2 170-2. The target gNB 2 170-2 implements admission control 210, and sends to the source gNB 170 an acknowledgement 216 of the handover request 208. The target gNB 1 170-1 also implements its own admission control 212, and sends to the source gNB 170 an acknowledgement 214 of the handover request 206. At 218, the source gNB 170 provides a RRC reconfiguration to the UE 110, and the UE 110 transmits a RRC reconfiguration complete message 220 to the source gNB 170.

At 222, the UE evaluates CHO conditions, and at 224 the UE 110 detaches from the old cell, and syncs with the new cell. At 226, the UE 110, the source gNB 170, and the target gNB 1 170-1 implement a CHO handover completion procedure 226. In the example shown in FIG. 2, the UE has switched to the target gNB 1 170-1 rather than to the target gNB 2 170-2. As shown, the target gNB 1 170-1 transmits a handover success message 228 to the source gNB 170. The source gNB 170 transmits a SN status transfer message 230 to the target gNB 170-1. The source gNB 170 transmits a handover cancel message 232 to target gNB 1 170-1, and the source gNB 170 and/or the target gNB 1 170-1 transmits a handover cancel message 232-2 to the target gNB 2 170-2.

The examples described herein consider aspects related to bullet a) of the SI objectives, namely on data that may be needed by an ML algorithm as input, and to bullet c) of the SI objectives, namely the impacts that may be needed on the Xn interface.

In CHO a source gNB prepares one or more candidate target cells and the target cells reserve resources. The number of prepared target cells may be large. Inefficient resource utilization may occur in several cases. For example, if:

1. CHO fails, then the reserved resources are wasted
2. A large number of cells is prepared (and not used by a UE), then a large amount of resources may be reserved unnecessarily.
3. A cell is prepared too early, then the resources are reserved for a longer period of time Typically in CHO, a target cell is prepared reasonably early to make sure that the UE is still under good radio conditions when the CHO is prepared (i.e. the network sends the CHO configuration to the UE). Therefore, aspect 3, related to the timing of the preparation, is very important in avoiding resource wastage.

In existing standards, necessary signaling exists that allows a source gNB to collect a lot of information regarding a handover. For example, the source can receive from the target gNB load information and a handover outcome (e.g., RLF indication, handover report). The target may also indicate it does not want to have prepared too many cells for the UE. However, further assistance information provided to the source gNB can help it better determine how many, which cells and when to prepare those for a given UE to reduce inefficient usage of resources. In particular, the source cell does not know how its preparation policy corresponds to other cells. For example, the source cell does not know whether it is more costly than other source nodes, or on the contrary, whether the source cell causes less resource consumption for its UEs than other nodes.

Load information on X2/Xn (TNL, CAC, PRB utilization, etc.) does not describe anything about the capability of supporting CHO preparation (CHO preparations do not directly translate into current load definitions).

Arrival probability helps the target (e.g. target gNB 170-2 and/or target gNB 2 170-2) to tailor the load reservation. Still, actual pain of too early or in vain preparation is not captured in existing signaling.

In CHO-MRO, the source cell can minimize preparation time and in-vain-preparation (which is typically a trade-off between robustness and preparation overhead). But it doesn't have information about how painful in-vain-preparation or too long preparation time really is for a specific target. Thus, the source cell can only assume that it is equally painful for all targets (which may not be the case due to different implementations in multi-vendor cases).

A CHO target may provide the information about the maximum number of preparations at its cells per given UE.

The examples described herein propose sending a cost from each candidate target gNB to the source gNB upon handover cancellation. The cost can also be sent from the actual target gNB to the source gNB that initiated the handover upon handover completion (success). The cost can also be sent from a target gNB to the source gNB that initiated the handover upon handover failure.

The cost can be calculated based on a difference of costs between the source that initiated the handover and other sources calculated at a target or candidate target gNB. In this way, each target or candidate target can obtain a "relative cost" it observes between any two source nodes and communicate it to its source.

The cost can also be calculated internally at the target or candidate target cell and can measure an internal strain/pain that this CHO configuration caused at the node, e.g., the cost can be calculated based on an internal load at the target or candidate target such as a CHO load.

The cost can take both positive and negative values, thus allowing for providing a "penalty" or a "reward".

Figure 3:
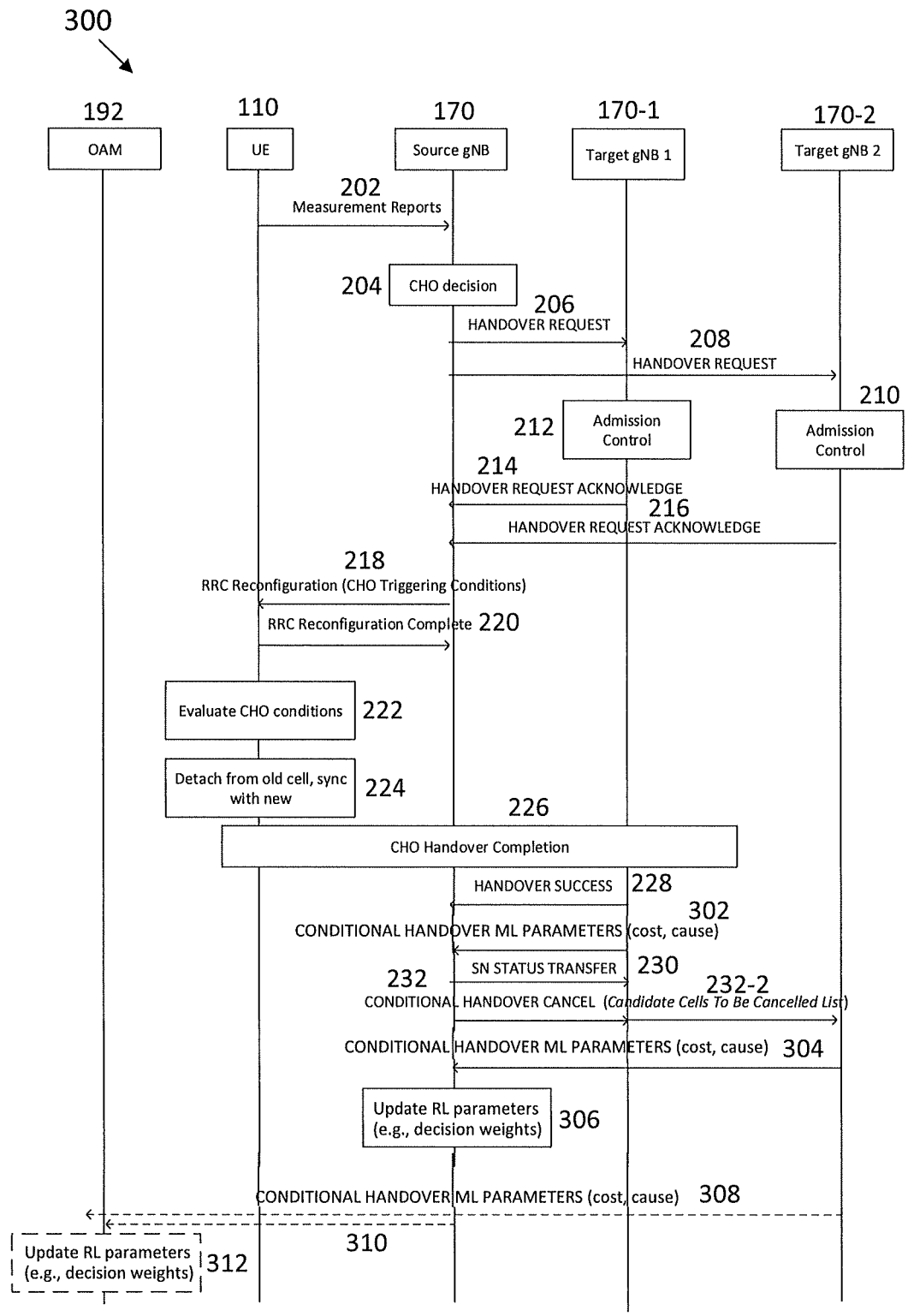
FIG. 3 illustrates an example of the signaling described herein to implement conditional handover.

With reference to FIG. 3, the described method 300 includes sending a cost from each candidate target gNB (170-1 and 170-2) to the source gNB 170 upon handover completion (cancellation) (232, 232-2) or upon handover completion (success) (226, 228). As shown in FIG. 3, target gNB 1 170-1 sends a cost in the form of conditional handover ML parameters (cost, cause) 302 to the source gNB 170 upon handover completion (success) (226, 228). The target gNB 2 170-2 sends a cost in the form of conditional handover ML parameters (cost, cause) 304 to the source gNB 170 upon handover completion (cancellation) 232-2.

Some examples of cost sent at 302, 304, and 308 are listed next as (A) and (B):

(A) The cost can be calculated based on comparative differences regarding reservation costs between source A that initiated the handover and another source B as seen (calculated) by the (candidate) target and reported to source A. In one example this cost difference is negative if source A has better CHO preparations (of less cost) towards a given target as compared to other gNBs/sources (e.g., it prepares the CHO later than other sources) and therefore the cost is in fact a reward. In another example, the cost difference is positive if the source has a higher cost to prepare a candidate target as opposed to another source. This cost could be in terms of the number of CHO preparations per cell, e.g., if the source configures a higher number of CHOs per cell compared to other nodes; the larger the number the higher the cost. This cost can be in the time duration of CHO reservations by the given source compared to other NG-RAN nodes ("delta" to average time of reservations), e.g., if a given source schedules CHOs much in advance in comparison with other nodes it would measure the delta difference; the larger the delta the more the cost.

(B) The cost can also be calculated internally at the target or candidate target cell and measure internal strain/pain that this CHO configuration caused at the node, e.g., the cost can be calculated based on an internal load at the target or candidate target such as a CHO load. In one example, it can indicate the "impact" of configuring this handover at a NG-RAN node and can be determined internally by the node e.g., with respect to other parallel processes that it needs to run or based on an average load. As a further example, the impact can be higher if the handover failed at the target as opposed to being cancelled and it can be the smallest if handover was successful.

Figure 4:
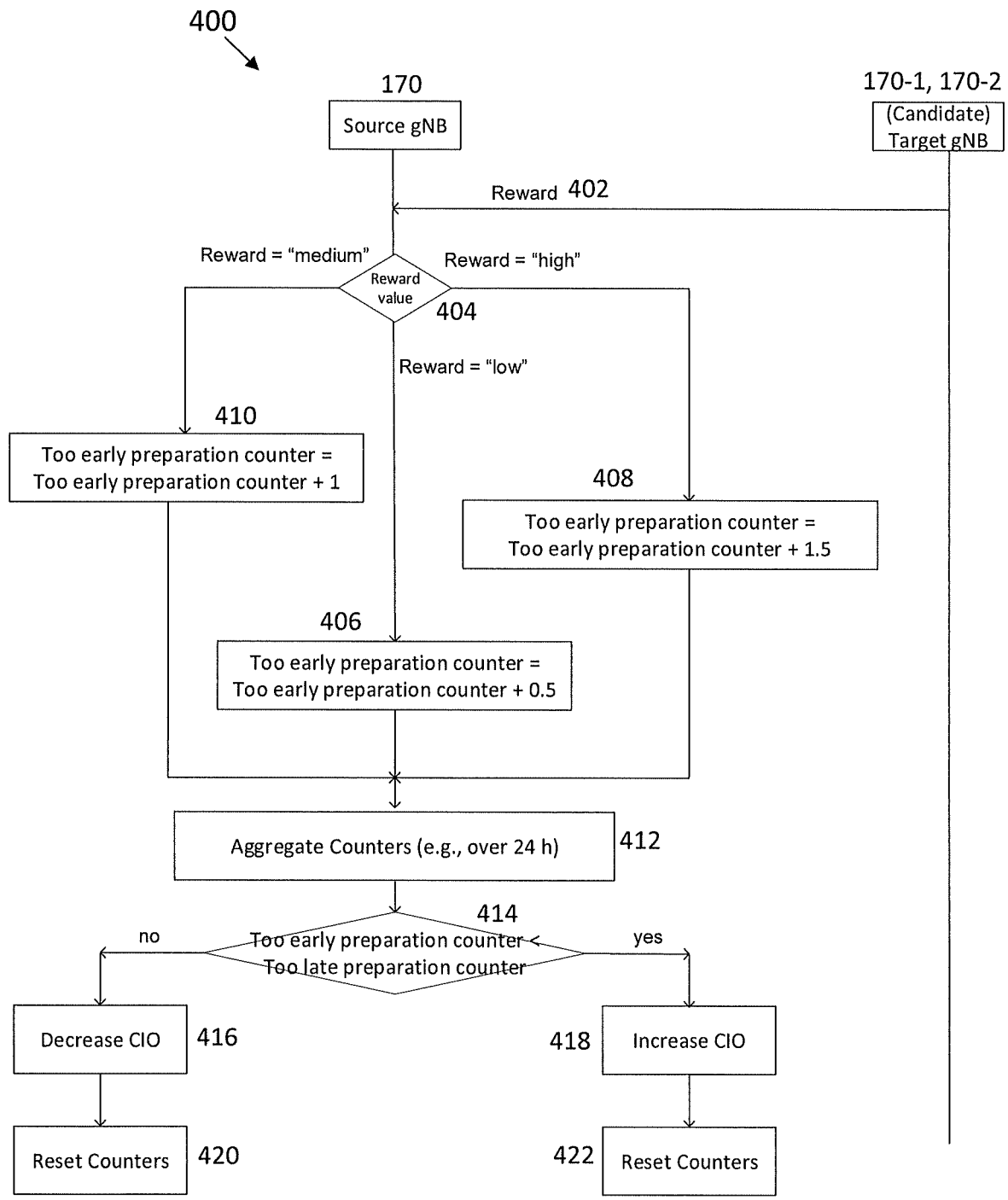
FIG. 4 shows an example of reward usage by a source gNB.

A source gNB 170 receiving the cost within messages 302 and 304 can use it as a weight/value to scale (down)/decrease its count of too early CHO preparations and adjust its policy (at 306) to prepare CHOs less early (refer to the implementation example provided herein with reference to FIG. 4). At 306, the source gNB 170 updates Reinforcement Learning (RL) parameters (e.g., decision weights) related to CHO. The cost can be in the range of (0,1] or (0,100] with values closer to 0 indicating less cost as opposed to values closer to 100. As another alternative the cost can take values in the range {low, medium, high}. In case the cost is represented as a comparative difference of costs, it can take a negative value (which would then be interpreted as a reward—but also an alternate interpretation of the positive and negative numbers is possible). In that case the cost can be in the [−1,1] range or in the [−100,100] range or in a general range [−x,x] for an integer x.

Specifically, the cost sent in IEs 302 and 304 can be used to update the threshold (the updating occurring at 306) that characterizes a CHO preparation as too early. If the number of received consecutive costs received by a source gNB 170 exceeds a first threshold, the source gNB 170 decreases a second threshold that categorizes a CHO preparation as too early.

Both UE-associated and non UE-associated signaling can be used to send the cost between two peer NG-RAN nodes (target or candidate target→source). In case of non-UE-associated signaling, the UE identity for which the CHO was configured, when it exists, can be sent to the source gNB through non UE-associated signaling. Associating UE identity to a CHO related cost can help the source 170 take more customized decisions (e.g., based on a UE 110 or group of UEs 110 with similar mobility patterns).

If OAM 192 supports training through RL the cost can also (or alternatively) be sent (e.g. within message 308) from a target or candidate target gNB (170-1, 170-2) to OAM 192. The cost can help the source 170 or OAM 192 respectively determine when to initiate the CHO. IE/message 308 also comprises conditional handover ML parameters (cost, cause).

The cost can be sent by the target gNB in an existing message of the handover procedure from the target to the source such as for example in a HANDOVER SUCCESS message such as handover success message 228. However, a better alternative would be to introduce a new message, e.g., CONDITIONAL HANDOVER ML PARAMETERS message 302 to convey signaling related to ML. This is because the time scale of the messages that are needed to be exchanged over the Xn interface 176 for ML operation may be different than normal SON-based messages.

According to an additional example, the cost can also be sent by each of the candidate target gNBs (for which the handover condition did not get executed such as target gNB 2 170-2 in FIG. 2 and FIG. 3). This can be done using a new message e.g., a CONDITIONAL HANDOVER ML PARAMETERS message 304. In one alternative an existing message in XnAP can be used. As one example the CONDITIONAL HANDOVER CANCEL message (232-2 or 232) can be reused also from a candidate target 170-2 to the source 170 to transfer the cost. Items 302, 304, and 308 may represent both the cost and the signaling IE/message.

Together with the cost, a (candidate) target gNB (170-1, 170-2) can include a cause that indicates a reason/trigger for the cost being sent by a gNB and characterizes its values e.g., too many concurrent CHOs (exceeding a threshold), too many CHOs configured on average per cell, higher time of preparation compared to other gNBs, gNB operating under high load/high CHO load, etc. The scale used to declare a cost can also be included e.g., (0,1] versus (0,100], [−1,1] or {low, medium, high} scale. Cost information can be used by the recipient of the message (302, 304, 308) to determine how early a CHO needs to be prepared at a candidate target. The recipient of the cost message can be another NG-RAN node and/or OAM. For example, at 312, the OAM 192 updates RL parameters (e.g., decision weights) related to a CHO based on the conditional handover ML parameters (cost, cause) 308 received from either or a combination of the candidate target gNB 170-2, target gNB 170-1, source gNB 170, and/or received indirectly from UE 110. At 310, the source gNB 170 transmits CHO related parameters such as related to cost/cause to the OAM 192.

Thus, in addition to the cost value (positive or negative), the signaling can indicate the quantity it measures (e.g. internal strain, load, time difference, time difference of CHO preparations, and/or number of CHO preparations). This way the radio node receiving the signaling is able to interpret the received cost value. This may be different from the cause IE such that the indication acts as a trigger to send the cost in a controlled way (when the trigger is met). Another option is that the cost is sent independently and not as a response to SUCCESS, FAILURE, or CANCELLATION in a HO. In that case the cause could be the trigger for when the message should be sent to neighbors.

Accordingly, the above embodiments are shown in the example in FIG. 3.

As mentioned, the cost can also be counted with respect to a load at a (candidate) target gNB. Thus, another way to communicate a "cost" is to communicate the load information from candidate target gNBs to the source gNB/OAM. Cause value behind the cost can be related to a high CHO load.

To measure CHO load, two different approaches can be implemented, a centralized approach and a distributed approach.

In the centralized approach, the OAM 192 may configure new counters at an NG-RAN node. The counters can count: i) an average number of prepared CHOs that are successful, ii) an average number of prepared CHOs that have failed, iii) an average number of prepared CHOs that have been cancelled, iv) an average time it took for a CHO to complete in success, v) an average time it took for a CHO to be cancelled, vi) an average time it took for a CHO to fail and/or vii) an average number of concurrent CHO preparations.

In the distributed approach, an NG-RAN node can configure new CHO load measurements at a neighbor NG-RAN node. To do that the resource status request message can be updated to request measurements of CHO load from a gNB. The gNB can report: i) an amount of resources reserved for CHO, ii) a number of concurrent CHO preparations and their status, iii) a time it took for the last CHO (configured possibly by another node) to complete and the status it completed (success, cancelled), and/or iv) how much longer a CHO configured by the requester took to complete as compared to the average time to complete of other CHO configurations from other nodes (can be a positive or negative value).

This can be done by modifying the resource status request message. The existing mechanism can be reused but where a bit is added to request CHO load. CHO Load can be in terms of any of the below shown in Table 1 (e.g., "Sixth Bit=CHO load"), Table 2, and Table 3, or a combination of all measurements.

TABLE 1

| IE/Group Name | Presence | Range | IE type and reference | Semantics description | Criticality | Assigned Criticality |
|---|---|---|---|---|---|---|
| Message Type | M | | 9.2.3.1 | | YES | reject |
| NG-RAN node1 Measurement ID | M | | INTEGER (1..4095, . . .) | Allocated by NG-RAN node$_1$ | YES | reject |
| NG-RAN node2 Measurement ID | C-ifRegistrationRequestStoporAdd | | INTEGER (1..4095, . . .) | Allocated by NG-RAN node$_2$ | YES | ignore |
| Registration Request | M | | ENUMERATED (start, stop, add, . . .) | Type of request for which the resource status is required. | YES | reject |
| Report Characteristics | C-ifRegistrationRequestStart | | BITSTRING (SIZE(32)) | Each position in the bitmap indicates the measurement object the NG-RAN node2 is requested to report. First Bit = PRB Periodic, Second Bit = TNL Capacity Ind Periodic, Third Bit = Composite Available Capacity Periodic, Fourth Bit = Number of Active UEs, Fifth Bit = RRC connections. Sixth Bit = CHO load Other bits shall be ignored by the NG-RAN node2. | YES | reject |

TABLE 1-continued

| IE/Group Name | Presence | Range | IE type and reference | Semantics description | Criticality | Assigned Criticality |
|---|---|---|---|---|---|---|
| Cell To Report List | | 0..1 | | Cell ID list to which the request applies. | YES | ignore |
| >Cell To Report Item | | 1 .. <maxnoofCellsinNG-RANnode> | | | — | |
| >>Cell ID | M | | Global NG-RAN Cell Identity 9.2.2.27 | | — | |
| >>SSB To Report List | | 0..1 | | SSB list to which the request applies. | — | |
| >>>SSB To Report Item | | 1 .. < maxno ofSSB Areas > | | | — | |
| >>>>SSB-Index | M | | INTEGER (0..,63..) | | — | |
| >>Slice To Report List | | 0..1 | | S-NSSAI list to which the request applies. | — | |
| >>>Slice To Report Item | | 1 .. < maxno ofBPLMNs > | | | — | |
| >>>>PLMN Identity | M | | 9.3.1.14 | Broadcast PLMN | — | |
| >>>>S-NSSAI List | | 1 | | | — | |
| >>>>>S-NSSAI Item | | 1 .. < maxno ofSlice Items> | | | — | |
| >>>>>>S-NSSAI | M | | S-NSSAI 9.3.1.38 | | — | |
| Reporting Periodicity | O | | ENUMERATED (500 ms, 1000 ms, 2000 ms, 5000 ms, 10000 ms, . . .) | Periodicity that can be used for reporting of PRB Periodic, TNL Capacity Ind Periodic, Composite Available Capacity Periodic. Also used as the averaging window length for all measurement objects if supported. | YES | ignore |

TABLE 2

| Condition | Explanation |
| --- | --- |
| ifRegistrationRequestStoporAdd | This IE shall be present if the Registration Request IE is set to the value "stop" or "add". |
| ifRegistrationRequestStart | This IE shall be present if the Registration Request IE is set to the value "start". |

TABLE 3

| Range bound | Explanation |
| --- | --- |
| maxnoofCellsinNG-RANnode | Maximum no. of cells that can be served by a NG-RAN node. Value is 16384. |
| maxnoofSSBAreas | Maximum no. of SSB Areas that can be served by a NG-RAN node cell. Value is 64. |
| maxnoofSliceItems | Maximum no. of signaled slice support items. Value is 1024. |

With reference to FIG. 4, an implementation example 400 is provided next related to how the information can be used by a network optimization method.

A network optimization method would fine-adjust the measurement reporting event which triggers the source cell to start the conditional handover preparation, e.g. it may optimize the cell individual offset (CIO) of an A3 condition.

For a certain period (e.g. 24 hours), the source cell may count two different events (below events classified as (1) and (2)) for a specific neighbor (and potential CHO target). Refer to item 412 of FIG. 4, where the source gNB 170 aggregates counters (e.g., over a 24 hour period).

(1) Events when the CHO preparation was triggered too late: these cases typically lead to "too late handovers", i.e. radio link failures. The source cell gets this information via a RLF indication, which also contains the RLF Report which in turn was compiled by the UE after the RLF and contains measurements.

(2) Events when the CHO preparation was triggered too early: the source cell may determine these cases as follows. A target candidate that is cancelled (due to CHO execution to another target, or since it is no longer needed), may be counted as a too early preparation. If a CHO is successfully completed, the source may compare the preparation time (i.e. the time between preparing the target for CHO and its completion) with a threshold, e.g. 1 seconds. If the preparation time is larger than the threshold, the CHO preparation is assumed to be unnecessarily early and the event is counted as a too early CHO preparation. If preparation time is smaller than the threshold, then the event may not be counted.

After this period, the source cell 170, at 414, may compare the too early CHO preparation count with the too late CHO preparation count. If the too early CHO preparation count is larger (determination at 414 is "no"), the source 170 may decide to make the preparation towards this target later for future CHOs, e.g. by decreasing the CIO at 416 towards this target for the corresponding measurement event, e.g. by 1 dB. If the too late CHO preparation count is larger (determination at 414 is "yes"), the source 170 may decide to make the preparation towards this target earlier for future CHOs, e.g. by increasing at 418 the CIO towards this target for the corresponding measurement event, e.g. by 1 dB.

After this optimization step, the source 170 may at 420 and 422 reset the counters and start the counting of the events again (at 412).

Note that this is only an example, other methods are possible and could also be implemented in central entities ("OAM" 192), or at other locations such as network element 190.

In such an implementation, it is observed that the source cell 170 inherently assumes that in-vain and too early preparations have a certain cost for the target (also expressed by the time threshold mentioned above). However, this may not be the case. For some targets, the early preparations may not cause any costs, for other targets, the costs might be even more severe than assumed by the source (e.g. targets in an extremely loaded area, and/or with a very economic implementation).

FIG. 4 further shows an example of reward usage by a source gNB 170 within the implementation example 400. With the information delivered by the target gNB 170-1 and candidate target 170-2 according to one of the embodiments above, the optimization method may benefit as follows. As an example, assume that the (candidate)target (170-1, 170-2) provides at 402 as reward information {low, medium, high}. At 404, the source gNB 170 determines the reward value, where for example the value is low, medium, or high. Instead of increasing the "too early CHO preparation counter" introduced above by 1, the source 170 would increase the counter, by 0.5 if the reward was signaled as "low" (at 406), by 1.5 if the reward was signaled as "high" (at 408), and by 1 if the reward was signaled as "medium" (at 410).

Alternatively, or in addition, the information can also be used to modify the time threshold. Receiving a large number of "high" rewards 402 may be used by the source to reduce the threshold, e.g. by 100 ms. Receiving a large number of "low" rewards may be used by the source 170 to increase the threshold e.g. by 100 ms. The rest of the optimization method remains as is, as illustrated in FIG. 4.

Such a realization leverages the advantage of the examples described herein, namely that the implementation of different targets can be taken into account, unnecessarily aggressive optimization of the CHO preparation is avoided, if the target has little costs for too many handover preparations, and optimization is made more aggressive if a target has high costs.

In summary, the examples described herein include the concept of requesting and collecting feedback (e.g. 302, 304, 308, 402) information between base stations (e.g. 170, 170-1, 170-2) and using feedback information (306, 312, refer also to 404, 406, 408, 410, 414, 416, 418, 420, and 422) in an ML algorithm (300, 400) for CHO. A new IE is provided to request feedback information (228, 230, 232, 232-2) from another gNB which feeds back information (302, 304, 402). A new IE is provided to provide feedback information (302, 304, 402) back to the source gNB 170.

There are several advantages and technical effects of the examples described herein. Usage of received feedback information as input to an ML algorithm at the base station improves CHO decisions/commands in order to reduce/limit the radio resource reservation/allocation at other base stations. The examples herein provide this CHO procedure/message flow.

The examples herein may be related to 3GPP TR 37.817 for Rel. 17, T538.423 and for Rel. 18 SI RP-201620, and targeted for 3GPP Rel-18 and beyond. The examples described herein can be implemented through the signaling introduced over the Xn interface 176 (e.g. for 3GPP TS 38.423). In addition, the methods described herein can be implemented through the introduction of new counters related to CHO in e.g. 3GPP TS 28.552.

Figure 5:
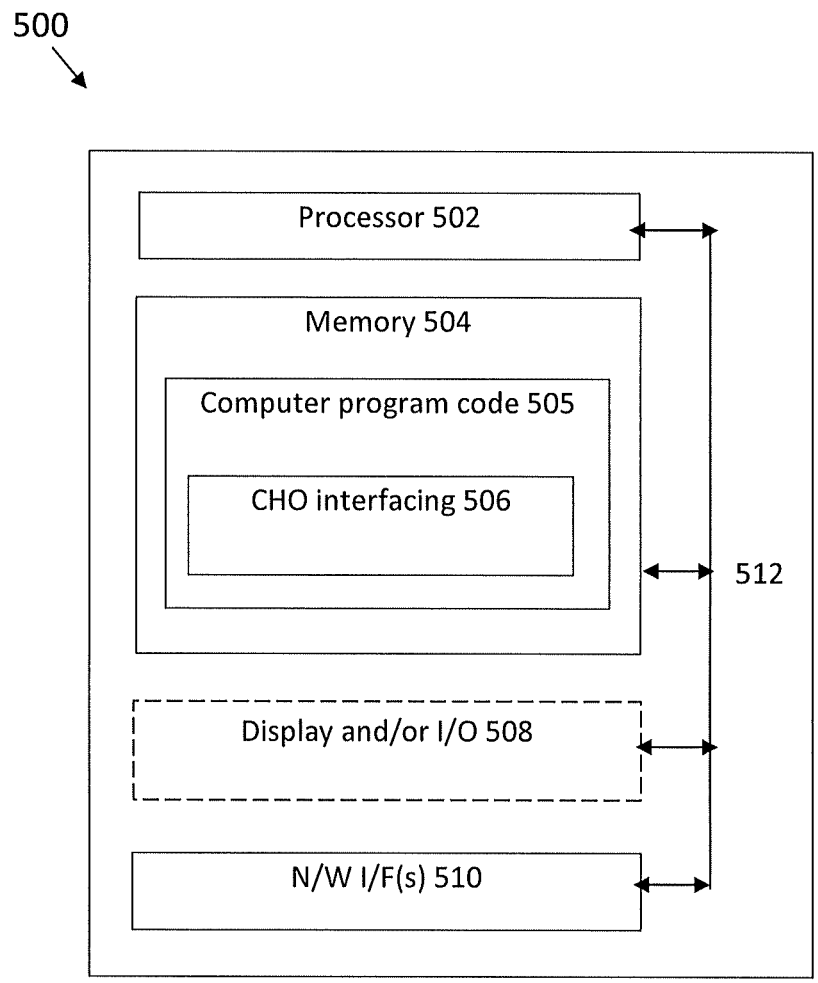
FIG. 5 is an example apparatus configured to implement information exchange through the interfaces for ML-based CHO, based on the examples described herein.

FIG. 5 is an example apparatus 500, which may be implemented in hardware, configured to implement the examples described herein. The apparatus 500 comprises a processor 502, at least one non-transitory or transitory memory 504 including computer program code 505, wherein the at least one memory 504 and the computer program code 505 are configured to, with the at least one processor 502, cause the apparatus 500 to implement circuitry, a process, component, module, or function (collectively CHO interfacing 506) to implement information exchange through the interfaces for ML-based CHO.

The apparatus 500 optionally includes a display and/or I/O interface 508 that may be used to display aspects or a status of the methods described herein (e.g., as one of the methods is being performed or at a subsequent time). The apparatus 500 includes one or more network (N/W) interfaces (I/F(s)) 510. The N/W I/F(s) 510 may be wired and/or wireless and communicate over the Internet/other network(s) via any communication technique. The N/W I/F(s) 510 may comprise one or more transmitters and one or more receivers. The N/W I/F(s) 510 may comprise standard well-known components such as an amplifier, filter, frequency-converter, (de)modulator, and encoder/decoder circuitries and one or more antennas.

The apparatus 500 to implement the functionality of CHO interfacing 706 may be UE 110, RAN node 170, network element(s) 190 or OAM 192, where OAM 192 may be or may be part of network element 190. Thus, processor 502 may correspond respectively to processor(s) 120, processor(s) 152 and/or processor(s) 175, memory 504 may correspond respectively to memory(ies) 125, memory(ies) 155 and/or memory(ies) 171, computer program code 505 may correspond respectively to computer program code 123, module 140-1, module 140-2, and/or computer program code 153, module 150-1, module 150-2, and/or computer program code 173, and N/W I/F(s) 510 may correspond respectively to N/W I/F(s) 161 and/or N/W I/F(s) 180. Alternatively, apparatus 500 may not correspond to either of UE 110, RAN node 170, network element(s) 190, or OAM 192 as apparatus 500 may be part of a self-organizing/optimizing network (SON) node, such as in a cloud. The apparatus 500 may also be distributed throughout the network 500 including within and between apparatus 500 and any one of the network element(s) (190) (such as a network control element (NCE)) and/or the RAN node 170 and/or the UE 110.

Interface 512 enables data communication between the various items of apparatus 500, as shown in FIG. 5. Interface 512 may be one or more buses, or interface 512 may be one or more software interfaces configured to pass data between the items of apparatus 500. For example, when interface 512 is a software interface it may in part reside instead within computer program code 505 such as within CHO interfacing 506. In another example, the interface 512 may be one or more buses such as address, data, or control buses, and may include any interconnection mechanism, such as a series of lines on a motherboard or integrated circuit, fiber optics or other optical communication equipment, and the like. The apparatus 500 need not comprise each of the features mentioned, or may comprise other features as well.

Figure 6:
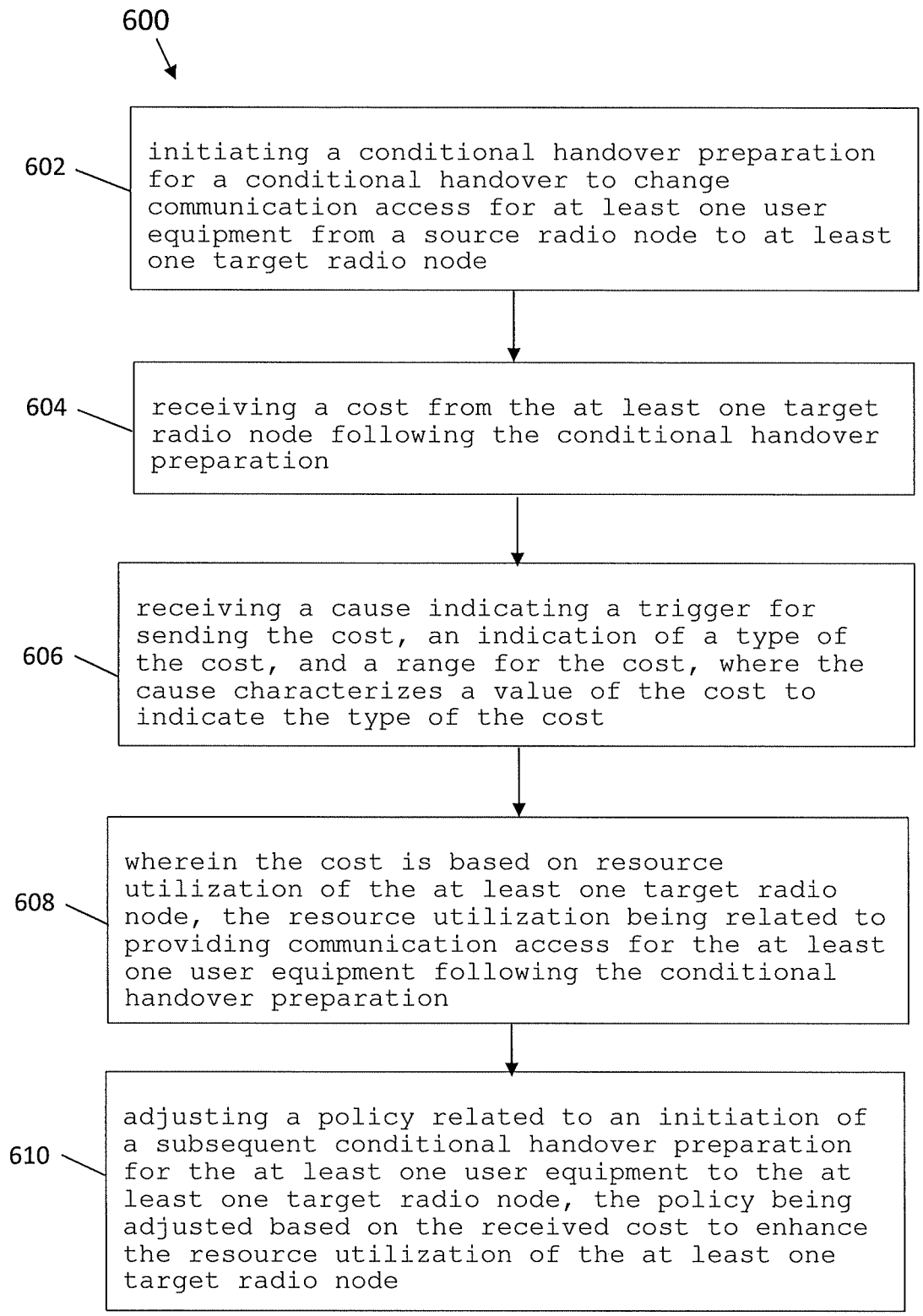
FIG. 6 is a method to implement information exchange through the interfaces for ML-based CHO, based on the examples described herein.

FIG. 6 is an example method 600 to implement information exchange through the interfaces for ML-based CHO, based on the example embodiments described herein. At 602, the method includes initiating a conditional handover preparation for a conditional handover to change communication access for at least one user equipment from a source radio node to at least one target radio node. At 604, the method includes receiving a cost from the at least one target radio node following the conditional handover preparation. At 606, the method includes receiving a cause indicating a trigger for sending the cost, an indication of a type of the cost, and a range for the cost, where the cause characterizes a value of the cost to indicate the type of the cost. At 608, the method includes wherein the cost is based on resource utilization of the at least one target radio node, the resource utilization being related to providing communication access for the at least one user equipment following the conditional handover preparation. At 610, the method includes adjust a policy related to an initiation of a subsequent conditional handover preparation for the at least one user equipment to the at least one target radio node, the policy being adjusted based on the received cost to enhance the resource utilization of the at least one target radio node. Method 600 may be performed with radio node 170 (e.g. source node 170), network element(s) 190, OAM node 192, apparatus 500, or a combination of those.

Figure 7:
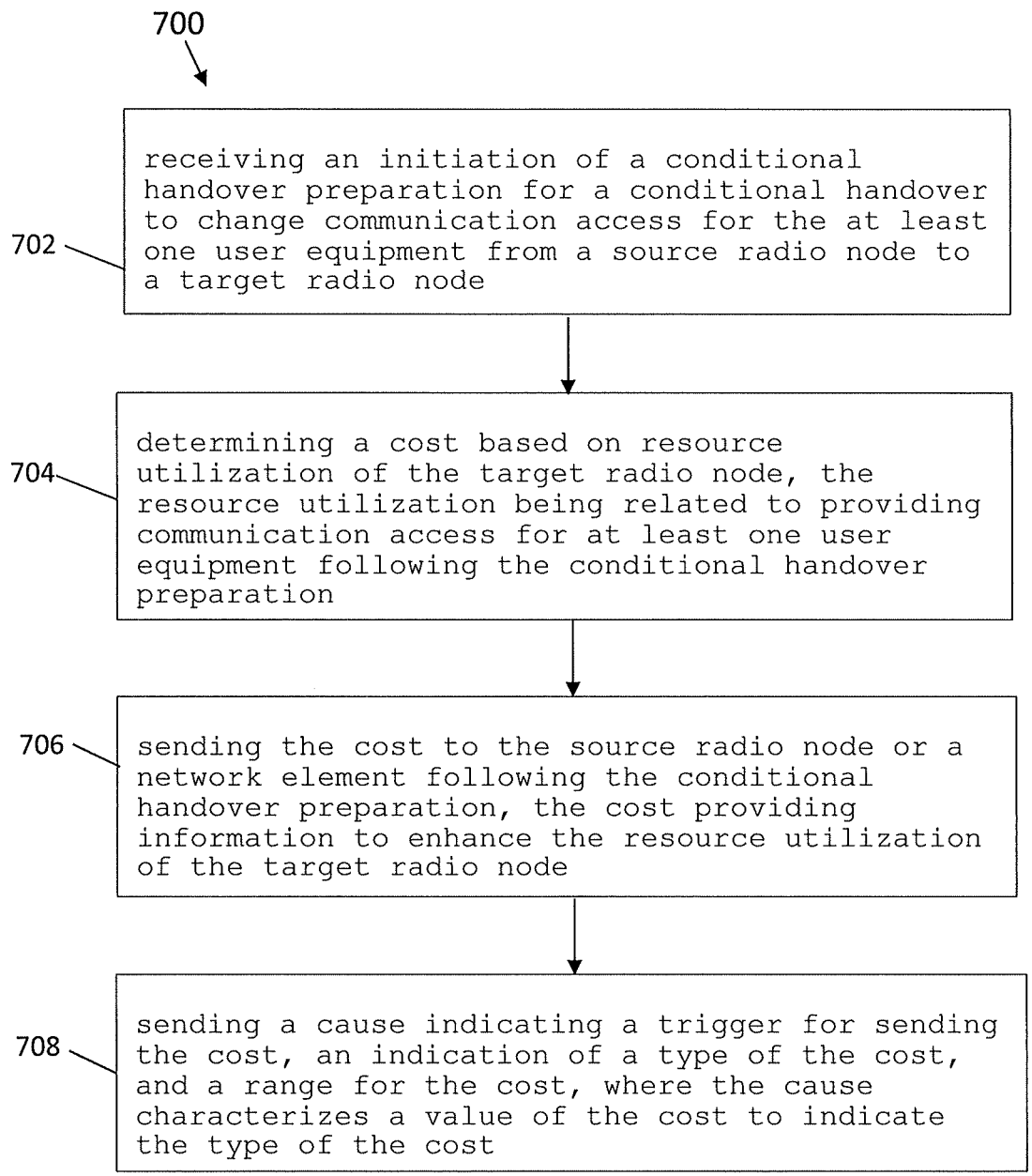
FIG. 7 is another method to implement information exchange through the interfaces for ML-based CHO, based on the examples described herein.

FIG. 7 is another example method 700 to implement information exchange through the interfaces for ML-based CHO, based on the example embodiments described herein. At 702, the method includes receiving an initiation of a conditional handover preparation for a conditional handover to change communication access for the at least one user equipment from a source radio node to a target radio node. At 704, the method includes determining a cost based on resource utilization of the target radio node, the resource utilization being related to providing communication access for at least one user equipment following the conditional handover preparation. At 706, the method includes sending the cost to the source radio node or a network element following the conditional handover preparation, the cost providing information to enhance the resource utilization of the target radio node. At 708, the method includes sending a cause indicating a trigger for sending the cost, an indication of a type of the cost, and a range for the cost, where the cause characterizes a value of the cost to indicate the type of the cost. Method 700 may be performed with radio node 170 (e.g. target node 170-1 or candidate target node 170-2), apparatus 500, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one non-transitory memory including computer program code; wherein the at least one memory and the computer program code are configured to, with the at least one processor, cause the apparatus at least to: initiate a conditional handover preparation for a conditional handover to change communication access for at least one user equipment from a source radio node to at least one target radio node; receive a cost from the at least one target radio node following the conditional handover preparation; receive a cause indicating a trigger for sending the cost, an indication of a type of the cost, and a range for the cost, where the cause characterizes a value of the cost to indicate the type of the cost; wherein the cost is based on resource utilization of the at least one target radio node, the resource utilization being related to providing communication access for the at least one user equipment following the conditional handover preparation; and adjust a policy related to an initiation of a subsequent conditional handover preparation for the at least one user equipment to the at least one target radio node, the policy being adjusted based on the received cost to enhance the resource utilization of the at least one target radio node.

The apparatus may further include wherein the at least one memory and the computer program code are further configured to, with the at least one processor, cause the apparatus at least to: provide communication access to a cell for the at least one user equipment.

The apparatus may further include wherein the cost is received from the at least one target radio node following a successful completion of the conditional handover to the at least one target radio node, following failure of the conditional handover to the at least one target radio node, or following a cancellation of the conditional handover to the at least one target radio node.

The apparatus may further include wherein the cost is received over an interface between the source radio node and the at least one target radio node, or over an interface between a network element and the at least one target radio node.

The apparatus may further include wherein the cost is received within a message comprising a successful conditional handover acknowledgement, within a conditional handover cancellation message, within a failure handover message, or within a separate message.

The apparatus may further include wherein the at least one memory and the computer program code are further configured to, with the at least one processor, cause the apparatus at least to: adjust the policy to change a timing of the initiation of the subsequent conditional handover preparation.

The apparatus may further include wherein the at least one memory and the computer program code are further configured to, with the at least one processor, cause the apparatus at least to: adjust the policy such that the initiation of the subsequent conditional handover preparation is performed less early relative to a schedule for the initiation of the conditional handover preparation.

The apparatus may further include wherein the cost is based on a difference between a first cost of the source radio node that provided the initiation of the conditional handover preparation and a second cost of a second source radio node, the cost being a relative cost between the source radio node and the second source radio node.

The apparatus may further include wherein the cost takes on a value within the range for the cost, and the cost is a discrete or continuous variable.

The apparatus may further include wherein the cost is based on a first number of conditional handovers prepared per cell of the source radio node as the first cost, compared to a second number of conditional handovers prepared per cell of the second source radio node as the second cost.

The apparatus may further include wherein the cost is based on a first time duration of conditional handover reservations of the source radio node as the first cost, compared to a second time duration of conditional handover reservations of the second source radio node as the second cost, a higher value for the first cost and the second cost being attributed to scheduling the conditional handover reservations further in advance.

The apparatus may further include wherein the cost is based on a load associated with the at least one target radio node.

The apparatus may further include wherein the load is central to the at least one target radio node, or the load is distributed between the at least one target radio node and one or more other radio nodes.

The apparatus may further include wherein the central load is based on at least one of: an average number of successfully prepared conditional handovers; an average number of failed conditional handovers; an average number cancelled conditional handovers; an average completion time of the successfully prepared conditional handovers; an average time taken to cancel the cancelled conditional handovers; an average time taken for handover to fail; or an average number of concurrent conditional handover preparations.

The apparatus may further include wherein: the distributed load is based on a report provided to the at least one target radio node from the one or more other radio nodes; and the report is based on at least one of: an amount of resources reserved for conditional handover; a number of concurrent conditional handover preparations and their status; a time taken to complete, fail, or cancel a last conditional handover and a completion or cancellation status of the last conditional handover; or a length of time a conditional handover configured with a requestor took to complete as compared to an average time of completion of other conditional handover configurations from the one or more other radio nodes.

The apparatus may further include wherein the at least one memory and the computer program code are further configured to, with the at least one processor, cause the apparatus at least to: receive a scale used to declare the cost.

The apparatus may further include wherein the cost is received together with an identity of the at least one user equipment, or together with an identity of a group of a plurality of user equipments.

The apparatus may further include wherein the type of cost is load or conditional handover time difference.

The apparatus may further include wherein the value of the cost comprises at least one of: a number of concurrent conditional handover preparations exceeding a threshold; a number of conditional handovers configured on average per the at least one user equipment; a time difference of preparation of the at least one target radio node compared to other radio nodes; or an indication that the at least one target radio node is operating under a high load, or under a high conditional handover load.

The apparatus may further include wherein the at least one memory and the computer program code are further configured to, with the at least one processor, cause the apparatus at least to: maintain a first counter within a time period related to a number of conditional handover preparations prepared too early; and maintain a second counter within the time period related to a number of conditional handover preparations prepared too late.

The apparatus may further include wherein the at least one memory and the computer program code are further configured to, with the at least one processor, cause the apparatus at least to: compare the first counter to the second counter; in response to the first counter being greater than the second counter, adjust the policy such that the initiation of the subsequent conditional handover preparation is performed later relative to a scheduling of the initiation of the conditional handover preparation, via decreasing a cell individual offset towards the at least one target radio node; and in response to the second counter being greater than the first counter, adjust the policy such that the initiation of the subsequent conditional handover preparation is performed earlier relative to a scheduling of the initiation of the conditional handover preparation, via increasing the cell individual offset towards the at least one target radio node.

The apparatus may further include wherein the at least one memory and the computer program code are further configured to, with the at least one processor, cause the apparatus at least to: increase the first counter in response to receiving a an indication of a cancellation of the conditional handover preparation; or increase the first counter in response to a preparation time of a successfully completed conditional handover exceeding a time threshold.

The apparatus may further include wherein the at least one memory and the computer program code are further configured to, with the at least one processor, cause the apparatus at least to: increase a value counter in response to receiving a cost having a value, or in response to receiving a cost having a value that exceeds a cost value threshold or does not exceed a cost value threshold; and decrease or increase the time threshold in response to the value counter exceeding a value counter threshold.

The apparatus may further include wherein the at least one memory and the computer program code are further configured to, with the at least one processor, cause the apparatus at least to: decrease the time threshold when the value of the cost is characterized as a penalty for preparing the conditional handover preparation too early; and increase the time threshold when the value of the cost is characterized as a reward for not preparing the conditional handover preparation too early.

The apparatus may further include wherein the at least one memory and the computer program code are further configured to, with the at least one processor, cause the apparatus at least to: increase the second counter after receiving a radio link failure report from the at least one user equipment.

The apparatus may further include wherein the at least one memory and the computer program code are further configured to, with the at least one processor, cause the apparatus at least to: determine a value of the cost; increase or decrease the first counter or the second counter depending on the value of the cost.

The apparatus may further include wherein the at least one memory and the computer program code are further configured to, with the at least one processor, cause the apparatus at least to: reset the first counter and the second counter after the time period.

The apparatus may further include wherein the time period is twenty-four hours.

The apparatus may further include wherein the at least one memory and the computer program code are further configured to, with the at least one processor, cause the apparatus at least to: determine whether a number of consecutively received costs exceeds a first threshold; and in response to the number of consecutively received costs exceeding the first threshold, decreasing a second threshold related to categorizing conditional handover preparation as too early.

The apparatus may further include wherein the at least one memory and the computer program code are further configured to, with the at least one processor, cause the apparatus at least to: receive a measurement report from the at least one user equipment, wherein the conditional handover preparation is initiated based on the measurement report.

An example apparatus includes at least one processor; and at least one non-transitory memory including computer program code; wherein the at least one memory and the computer program code are configured to, with the at least one processor, cause the apparatus at least to: receive an initiation of a conditional handover preparation for a conditional handover to change communication access for the at least one user equipment from a source radio node to a target radio node; determine a cost based on resource utilization of the target radio node, the resource utilization being related to providing communication access for at least one user equipment following the conditional handover preparation; send the cost to the source radio node or a network element following the conditional handover preparation, the cost providing information to enhance the resource utilization of the target radio node; and send a cause indicating a trigger for sending the cost, an indication of a type of the cost, and a range for the cost, where the cause characterizes a value of the cost to indicate the type of the cost.

The apparatus may further include wherein the at least one memory and the computer program code are further configured to, with the at least one processor, cause the apparatus at least to: provide communication access to a cell for the at least one user equipment following a successful conditional handover to the target radio node.

The apparatus may further include wherein the cost is sent to the source radio node or the network element following a successful completion of the conditional handover to the target radio node, following failure of the conditional handover to the target radio node, or following a cancellation of the conditional handover to the target radio node.

The apparatus may further include wherein the cost is sent over an interface between the source radio node and the target radio node, or over an interface between the network element and the target radio node.

The apparatus may further include wherein the cost is sent within a message comprising a successful conditional handover acknowledgement, within a conditional handover cancellation message, within a failure handover message, or within a separate message.

The apparatus may further include wherein the at least one memory and the computer program code are further configured to, with the at least one processor, cause the apparatus at least to: receive an initiation of a subsequent conditional handover preparation to the target radio node with an adjusted timing, based on the sent cost.

The apparatus may further include wherein the at least one memory and the computer program code are further configured to, with the at least one processor, cause the apparatus at least to: receive the initiation of the subsequent conditional handover preparation to the target radio node less early relative to a schedule for the initiation of the conditional handover preparation.

The apparatus may further include wherein the at least one memory and the computer program code are further configured to, with the at least one processor, cause the apparatus at least to: determine the cost based on a difference between a first cost of the source radio node that provided the initiation of the conditional handover preparation and a second cost of a second source radio node, to generate a relative cost between the source radio node and the second source radio node.

The apparatus may further include wherein the cost takes on a value within the range for the cost, and the cost is a discrete or continuous variable.

The apparatus may further include wherein the at least one memory and the computer program code are further configured to, with the at least one processor, cause the apparatus at least to: determine the cost based on a first number of conditional handovers prepared per cell of the source radio node as the first cost, compared to a second number of conditional handovers prepared per cell of the second source radio node as the second cost.

The apparatus may further include wherein the at least one memory and the computer program code are further configured to, with the at least one processor, cause the apparatus at least to: determine the cost based on a first time duration of conditional handover reservations of the source radio node as the first cost, compared to a second time duration of conditional handover reservations of the second source radio node as the second cost, a higher value for the first cost and the second cost being attributed to scheduling the conditional handover reservations further in advance.

The apparatus may further include wherein the at least one memory and the computer program code are further configured to, with the at least one processor, cause the apparatus at least to: determine the cost based on a load associated with the target radio node.

The apparatus may further include wherein the load is central to the target radio node, or the load is distributed between the target radio node and one or more other radio nodes.

The apparatus may further include wherein the central load is based on at least one of: an average number of successfully prepared conditional handovers; an average number of failed conditional handovers; an average number cancelled conditional handovers; an average completion time of the successfully prepared conditional handovers; an average time taken to cancel the cancelled conditional handovers; an average time taken for handover to fail; or an average number of concurrent conditional handover preparations.

The apparatus may further include wherein the at least one memory and the computer program code are further configured to, with the at least one processor, cause the apparatus at least to: request a resource status from the one or more other radio nodes; receive a report from the one or more other radio nodes, the report provided to the target radio node and the distributed load being based on the report; and the report is based on at least one of: an amount of resources reserved for conditional handover; a number of concurrent conditional handover preparations and their status; a time taken to complete, fail, or cancel a last conditional handover and a completion or cancellation status of the last conditional handover; or a length of time a conditional handover configured with a requestor took to complete as compared to an average time of completion of other conditional handover configurations from the one or more other radio nodes.

The apparatus may further include wherein the at least one memory and the computer program code are further configured to, with the at least one processor, cause the apparatus at least to: send a scale that declares the cost.

The apparatus may further include wherein the cost is sent together with an identity of the at least one user equipment, or together with an identity of a group of a plurality of user equipments.

The apparatus may further include wherein the type of cost is load or conditional handover time difference.

The apparatus may further include wherein the value of the cost comprises at least one of: a number of concurrent conditional handover preparations exceeding a threshold; a number of conditional handovers configured on average per the at least one user equipment; a time difference of preparation of the target radio node compared to other radio nodes; or an indication that the target radio node is operating under a high load, or under a high conditional handover load.

The apparatus may further include wherein the network element is an operations, administration and maintenance node.

A example method includes initiating a conditional handover preparation for a conditional handover to change communication access for at least one user equipment from a source radio node to at least one target radio node; receiving a cost from the at least one target radio node following the conditional handover preparation; receiving a cause indicating a trigger for sending the cost, an indication of a type of the cost, and a range for the cost, where the cause characterizes a value of the cost to indicate the type of the cost; wherein the cost is based on resource utilization of the at least one target radio node, the resource utilization being related to providing communication access for the at least one user equipment following the conditional handover preparation; and adjusting a policy related to an initiation of a subsequent conditional handover preparation for the at least one user equipment to the at least one target radio node, the policy being adjusted based on the received cost to enhance the resource utilization of the at least one target radio node.

An example method includes receiving an initiation of a conditional handover preparation for a conditional handover to change communication access for the at least one user equipment from a source radio node to a target radio node; determining a cost based on resource utilization of the target radio node, the resource utilization being related to providing communication access for at least one user equipment following the conditional handover preparation; sending the cost to the source radio node or a network element following the conditional handover preparation, the cost providing information to enhance the resource utilization of the target radio node; and sending a cause indicating a trigger for sending the cost, an indication of a type of the cost, and a range for the cost, where the cause characterizes a value of the cost to indicate the type of the cost.

An example non-transitory program storage device readable by a machine, tangibly embodying a program of instructions executable by the machine for performing operations is provided, the operations comprising: initiating a conditional handover preparation for a conditional handover to change communication access for at least one user equipment from a source radio node to at least one target radio node; receiving a cost from the at least one target radio node following the conditional handover preparation; receiving a cause indicating a trigger for sending the cost, an indication of a type of the cost, and a range for the cost, where the cause characterizes a value of the cost to indicate the type of the cost; wherein the cost is based on resource utilization of the at least one target radio node, the resource utilization being related to providing communication access for the at least one user equipment following the conditional handover preparation; and adjusting a policy related to an initiation of a subsequent conditional handover preparation for the at least one user equipment to the at least one target radio node, the policy being adjusted based on the received cost to enhance the resource utilization of the at least one target radio node.

An example non-transitory program storage device readable by a machine, tangibly embodying a program of instructions executable by the machine for performing operations is provided, the operations comprising: receiving an initiation of a conditional handover preparation for a conditional handover to change communication access for the at least one user equipment from a source radio node to a target radio node; determining a cost based on resource utilization of the target radio node, the resource utilization being related to providing communication access for at least one user equipment following the conditional handover preparation; sending the cost to the source radio node or a network element following the conditional handover preparation, the cost providing information to enhance the resource utilization of the target radio node; and sending a cause indicating a trigger for sending the cost, an indication of a type of the cost, and a range for the cost, where the cause characterizes a value of the cost to indicate the type of the cost.

An example apparatus includes means for initiating a conditional handover preparation for a conditional handover to change communication access for at least one user equipment from a source radio node to at least one target radio node; means for receiving a cost from the at least one target radio node following the conditional handover preparation; means for receiving a cause indicating a trigger for sending the cost, an indication of a type of the cost, and a range for the cost, where the cause characterizes a value of the cost to indicate the type of the cost; wherein the cost is based on resource utilization of the at least one target radio node, the resource utilization being related to providing communication access for the at least one user equipment following the conditional handover preparation; and means for adjusting a policy related to an initiation of a subsequent conditional handover preparation for the at least one user equipment to the at least one target radio node, the policy being adjusted based on the received cost to enhance the resource utilization of the at least one target radio node.

An example apparatus includes means for receiving an initiation of a conditional handover preparation for a conditional handover to change communication access for the at least one user equipment from a source radio node to a target radio node; means for determining a cost based on resource utilization of the target radio node, the resource utilization being related to providing communication access for at least one user equipment following the conditional handover preparation; means for sending the cost to the source radio node or a network element following the conditional handover preparation, the cost providing information to enhance the resource utilization of the target radio node; and means for sending a cause indicating a trigger for sending the cost, an indication of a type of the cost, and a range for the cost, where the cause characterizes a value of the cost to indicate the type of the cost.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The following acronyms and abbreviations that may be found in the specification and/or the drawing figures are defined as follows:

3GPP third generation partnership project
    4G fourth generation
    5G fifth generation
    5GC 5G core network
    A3 event A3 (neighbor becomes offset better than serving cell)
    AI artificial intelligence
    AMF access and mobility management function
    ASIC application-specific integrated circuit
    BPLMN background public land mobile network
    C conditional
    CAC call admission control
    CHO conditional handover
    CIO cell individual offset
    CU central unit or centralized unit
    DSP digital signal processor
    DU distributed unit
    eNB evolved Node B (e.g., an LTE base station)
    EN-DC E-UTRA-NR dual connectivity
    en-gNB node providing NR user plane and control plane protocol terminations towards the UE, and acting as a secondary node in EN-DC
    E-UTRA evolved universal terrestrial radio access, i.e., the LTE radio access technology
    F1 control interface between the CU and the DU
    FPGA field-programmable gate array
    gNB base station for 5G/NR, i.e., a node providing NR user plane and control plane protocol terminations towards the UE, and connected via the NG interface to the 5GC
    h hour or hours
    HO handover
    ID identifier
    IE information element
    I/F interface
    Ind indicator
    I/O input/output
    LMF location management function
    LTE long term evolution (4G)
    M mandatory
    MAC medium access control
    ML machine learning MME mobility management entity
MRO mobility robustness optimization
NCE network control element
ng or NG new generation
ng-eNB new generation eNB
NG-RAN new generation radio access network
no. number
NR new radio (5G)
N/W network
O optional
OAM operations, administration and maintenance
PDA personal digital assistant
PDCP packet data convergence protocol
PHY physical layer
PLMN public land mobile network
PRB physical resource block
RAN radio access network
RAN3 radio architecture enhancements
Rel release
RL reinforcement learning
RLC radio link control
RLF radio link failure
RP 3GPP RAN
RRC radio resource control (protocol)
RRH remote radio head
RU radio unit
Rx receiver or reception
SGW serving gateway
SI study item
SID study item description
S-NSSAI single network slice selection assistance information
SON self-organizing/optimizing network
SSB synchronization signal block
SN sequence number
TNL transport network layer
TR technical report
TRP transmission and/or reception point
TS technical specification
Tx transmitter or transmission
UE user equipment (e.g., a wireless, typically mobile device)
UPF user plane function
X2 network interface between RAN nodes and between RAN and the core network
Xn network interface between NG-RAN nodes
XnAP Xn application protocol

What is claimed is:

1. An apparatus comprising:
at least one processor; and
at least one non-transitory memory including computer program code;
wherein the at least one memory and the computer program code are configured to, with the at least one processor, cause the apparatus at least to:
initiate a conditional handover preparation for a conditional handover to change communication access for at least one user equipment from a source radio node to at least one target radio node;
receive a cost from the at least one target radio node following the conditional handover preparation;
receive a cause indicating a trigger for sending the cost, an indication of a type of the cost, and a range for the cost, where the cause characterizes a value of the cost to indicate the type of the cost;
wherein the cost is based on resource utilization of the at least one target radio node, the resource utilization being related to providing communication access for the at least one user equipment following the conditional handover preparation; and
adjust a policy related to an initiation of a subsequent conditional handover preparation for the at least one user equipment to the at least one target radio node, the policy being adjusted based on the received cost to enhance the resource utilization of the at least one target radio node.

2. The apparatus of claim 1, wherein the at least one memory and the computer program code are further configured to, with the at least one processor, cause the apparatus at least to:
provide communication access to a cell for the at least one user equipment.

3. The apparatus of claim 1, wherein the cost is received from the at least one target radio node following a successful completion of the conditional handover to the at least one target radio node, following failure of the conditional handover to the at least one target radio node, or following a cancellation of the conditional handover to the at least one target radio node.

4. The apparatus of claim 1, wherein the cost is received over an interface between the source radio node and the at least one target radio node, or over an interface between a network element and the at least one target radio node.

5. The apparatus of claim 1, wherein the cost is received within a message comprising a successful conditional handover acknowledgement, within a conditional handover cancellation message, within a failure handover message, or within a separate message.

6. The apparatus of claim 1, wherein the at least one memory and the computer program code are further configured to, with the at least one processor, cause the apparatus at least to:
adjust the policy to change a timing of the initiation of the subsequent conditional handover preparation.

7. The apparatus of claim 6, wherein the at least one memory and the computer program code are further configured to, with the at least one processor, cause the apparatus at least to:
adjust the policy such that the initiation of the subsequent conditional handover preparation is performed less early relative to a schedule for the initiation of the conditional handover preparation.

8. The apparatus of claim 1, wherein the cost is based on a difference between a first cost of the source radio node that provided the initiation of the conditional handover preparation and a second cost of a second source radio node, the cost being a relative cost between the source radio node and the second source radio node.

9. The apparatus of claim 1, wherein the cost takes on a value within the range for the cost, and the cost is a discrete or continuous variable.

10. The apparatus of claim 1, wherein the cost is based on a first number of conditional handovers prepared per cell of the source radio node as the first cost, compared to a second number of conditional handovers prepared per cell of the second source radio node as the second cost.

11. The apparatus of claim 1, wherein the cost is based on a first time duration of conditional handover reservations of the source radio node as the first cost, compared to a second time duration of conditional handover reservations of the second source radio node as the second cost, a higher value for the first cost and the second cost being attributed to scheduling the conditional handover reservations further in advance.

12. The apparatus of claim 1, wherein the cost is based on a load associated with the at least one target radio node.

13. The apparatus of claim 12, wherein the load is central to the at least one target radio node, or the load is distributed between the at least one target radio node and one or more other radio nodes.

14. The apparatus of claim 13, wherein the central load is based on at least one of:
   an average number of successfully prepared conditional handovers;
   an average number of failed conditional handovers;
   an average number cancelled conditional handovers;
   an average completion time of the successfully prepared conditional handovers;
   an average time taken to cancel the cancelled conditional handovers;
   an average time taken for handover to fail; or
   an average number of concurrent conditional handover preparations.

15. The apparatus of claim 13, wherein:
   the distributed load is based on a report provided to the at least one target radio node from the one or more other radio nodes; and
   the report is based on at least one of:
   an amount of resources reserved for conditional handover;
   a number of concurrent conditional handover preparations and their status;
   a time taken to complete, fail, or cancel a last conditional handover and a completion or cancellation status of the last conditional handover; or
   a length of time a conditional handover configured with a requestor took to complete as compared to an average time of completion of other conditional handover configurations from the one or more other radio nodes.

16. The apparatus of claim 1, wherein the at least one memory and the computer program code are further configured to, with the at least one processor, cause the apparatus at least to:
   receive a scale used to declare the cost.

17. The apparatus of claim 1, wherein the cost is received together with an identity of the at least one user equipment, or together with an identity of a group of a plurality of user equipments.

18. The apparatus of claim 1, wherein the type of cost is load or conditional handover time difference.

19. The apparatus of claim 1, wherein the value of the cost comprises at least one of:
   a number of concurrent conditional handover preparations exceeding a threshold;
   a number of conditional handovers configured on average per the at least one user equipment;
   a time difference of preparation of the at least one target radio node compared to other radio nodes; or
   an indication that the at least one target radio node is operating under a high load, or under a high conditional handover load.

20. The apparatus of claim 1, wherein the at least one memory and the computer program code are further configured to, with the at least one processor, cause the apparatus at least to:
   maintain a first counter within a time period related to a number of conditional handover preparations prepared too early; and
   maintain a second counter within the time period related to a number of conditional handover preparations prepared too late.

21. The apparatus of claim 20, wherein the at least one memory and the computer program code are further configured to, with the at least one processor, cause the apparatus at least to:
   compare the first counter to the second counter;
   in response to the first counter being greater than the second counter, adjust the policy such that the initiation of the subsequent conditional handover preparation is performed later relative to a scheduling of the initiation of the conditional handover preparation, via decreasing a cell individual offset towards the at least one target radio node; and
   in response to the second counter being greater than the first counter, adjust the policy such that the initiation of the subsequent conditional handover preparation is performed earlier relative to a scheduling of the initiation of the conditional handover preparation, via increasing the cell individual offset towards the at least one target radio node.

22. The apparatus of claim 20, wherein the at least one memory and the computer program code are further configured to, with the at least one processor, cause the apparatus at least to:
   increase the first counter in response to receiving a an indication of a cancellation of the conditional handover preparation; or
   increase the first counter in response to a preparation time of a successfully completed conditional handover exceeding a time threshold.

23. The apparatus of claim 22, wherein the at least one memory and the computer program code are further configured to, with the at least one processor, cause the apparatus at least to:
   increase a value counter in response to receiving a cost having a value, or in response to receiving a cost having a value that exceeds a cost value threshold or does not exceed a cost value threshold; and
   decrease or increase the time threshold in response to the value counter exceeding a value counter threshold.

24. The apparatus of claim 23, wherein the at least one memory and the computer program code are further configured to, with the at least one processor, cause the apparatus at least to:
   decrease the time threshold when the value of the cost is characterized as a penalty for preparing the conditional handover preparation too early; and
   increase the time threshold when the value of the cost is characterized as a reward for not preparing the conditional handover preparation too early.

25. The apparatus of claim 20, wherein the at least one memory and the computer program code are further configured to, with the at least one processor, cause the apparatus at least to:
   increase the second counter after receiving a radio link failure report from the at least one user equipment.

26. The apparatus of claim 20, wherein the at least one memory and the computer program code are further configured to, with the at least one processor, cause the apparatus at least to:
   determine a value of the cost;
   increase or decrease the first counter or the second counter depending on the value of the cost.

27. The apparatus of claim 20, wherein the at least one memory and the computer program code are further configured to, with the at least one processor, cause the apparatus at least to:

reset the first counter and the second counter after the time period.

28. The apparatus of claim 20, wherein the time period is twenty-four hours.

29. The apparatus of claim 1, wherein the at least one memory and the computer program code are further configured to, with the at least one processor, cause the apparatus at least to:
determine whether a number of consecutively received costs exceeds a first threshold; and
in response to the number of consecutively received costs exceeding the first threshold, decreasing a second threshold related to categorizing conditional handover preparation as too early.

30. The apparatus of claim 1, wherein the at least one memory and the computer program code are further configured to, with the at least one processor, cause the apparatus at least to:
receive a measurement report from the at least one user equipment, wherein the conditional handover preparation is initiated based on the measurement report.

31. An apparatus comprising:
at least one processor; and
at least one non-transitory memory including computer program code;
wherein the at least one memory and the computer program code are configured to, with the at least one processor, cause the apparatus at least to:
receive an initiation of a conditional handover preparation for a conditional handover to change communication access for the at least one user equipment from a source radio node to a target radio node;
determine a cost based on resource utilization of the target radio node, the resource utilization being related to providing communication access for at least one user equipment following the conditional handover preparation;
send the cost to the source radio node or a network element following the conditional handover preparation, the cost providing information to enhance the resource utilization of the target radio node; and
send a cause indicating a trigger for sending the cost, an indication of a type of the cost, and a range for the cost, where the cause characterizes a value of the cost to indicate the type of the cost.

32. The apparatus of claim 31, wherein the at least one memory and the computer program code are further configured to, with the at least one processor, cause the apparatus at least to:
provide communication access to a cell for the at least one user equipment following a successful conditional handover to the target radio node.

33. The apparatus of claim 31, wherein the cost is sent to the source radio node or the network element following a successful completion of the conditional handover to the target radio node, following failure of the conditional handover to the target radio node or following a cancellation of the conditional handover to the target radio node.

34. The apparatus of claim 31, wherein the cost is sent over an interface between the source radio node and the target radio node, or over an interface between the network element and the target radio node.

35. The apparatus of claim 31, wherein the cost is sent within a message comprising a successful conditional handover acknowledgement, within a conditional handover cancellation message, within a failure handover message, or within a separate message.

36. The apparatus of claim 31, wherein the at least one memory and the computer program code are further configured to, with the at least one processor, cause the apparatus at least to:
receive an initiation of a subsequent conditional handover preparation to the target radio node with an adjusted timing, based on the sent cost.

37. The apparatus of claim 36, wherein the at least one memory and the computer program code are further configured to, with the at least one processor, cause the apparatus at least to:
receive the initiation of the subsequent conditional handover preparation to the target radio node less early relative to a schedule for the initiation of the conditional handover preparation.

38. The apparatus of claim 31, wherein the at least one memory and the computer program code are further configured to, with the at least one processor, cause the apparatus at least to:
determine the cost based on a difference between a first cost of the source radio node that provided the initiation of the conditional handover preparation and a second cost of a second source radio node, to generate a relative cost between the source radio node and the second source radio node.

39. The apparatus of claim 31, wherein the cost takes on a value within the range for the cost, and the cost is a discrete or continuous variable.

40. The apparatus of claim 31, wherein the at least one memory and the computer program code are further configured to, with the at least one processor, cause the apparatus at least to:
determine the cost based on a first number of conditional handovers prepared per cell of the source radio node as the first cost, compared to a second number of conditional handovers prepared per cell of the second source radio node as the second cost.

41. The apparatus of claim 31, wherein the at least one memory and the computer program code are further configured to, with the at least one processor, cause the apparatus at least to:
determine the cost based on a first time duration of conditional handover reservations of the source radio node as the first cost, compared to a second time duration of conditional handover reservations of the second source radio node as the second cost, a higher value for the first cost and the second cost being attributed to scheduling the conditional handover reservations further in advance.

42. The apparatus of claim 31, wherein the at least one memory and the computer program code are further configured to, with the at least one processor, cause the apparatus at least to:
determine the cost based on a load associated with the target radio node.

43. The apparatus of claim 42, wherein the load is central to the target radio node, or the load is distributed between the target radio node and one or more other radio nodes.

44. The apparatus of claim 43, wherein the central load is based on at least one of:
an average number of successfully prepared conditional handovers;
an average number of failed conditional handovers;
an average number cancelled conditional handovers;
an average completion time of the successfully prepared conditional handovers;

an average time taken to cancel the cancelled conditional handovers;

an average time taken for handover to fail; or an average number of concurrent conditional handover preparations.

45. The apparatus of claim 43, wherein the at least one memory and the computer program code are further configured to, with the at least one processor, cause the apparatus at least to:

request a resource status from the one or more other radio nodes;

receive a report from the one or more other radio nodes, the report provided to the target radio node and the distributed load being based on the report; and the report is based on at least one of:

an amount of resources reserved for conditional handover;

a number of concurrent conditional handover preparations and their status;

a time taken to complete, fail, or cancel a last conditional handover and a completion or cancellation status of the last conditional handover; or a length of time a conditional handover configured with a requestor took to complete as compared to an average time of completion of other conditional handover configurations from the one or more other radio nodes.

46. The apparatus of claim 31, wherein the at least one memory and the computer program code are further configured to, with the at least one processor, cause the apparatus at least to:

send a scale that declares the cost.

47. The apparatus of claim 31, wherein the cost is sent together with an identity of the at least one user equipment, or together with an identity of a group of a plurality of user equipments.

48. The apparatus of claim 31, wherein the type of cost is load or conditional handover time difference.

49. The apparatus of claim 31, wherein the value of the cost comprises at least one of:

a number of concurrent conditional handover preparations exceeding a threshold;

a number of conditional handovers configured on average per the at least one user equipment;

a time difference of preparation of the target radio node compared to other radio nodes; or an indication that the target radio node is operating under a high load, or under a high conditional handover load.

50. The apparatus of claim 31, wherein the network element is an operations, administration and maintenance node.

51. A method comprising:

initiating a conditional handover preparation for a conditional handover to change communication access for at least one user equipment from a source radio node to at least one target radio node;

receiving a cost from the at least one target radio node following the conditional handover preparation;

receiving a cause indicating a trigger for sending the cost, an indication of a type of the cost, and a range for the cost, where the cause characterizes a value of the cost to indicate the type of the cost;

wherein the cost is based on resource utilization of the at least one target radio node, the resource utilization being related to providing communication access for the at least one user equipment following the conditional handover preparation; and adjusting a policy related to an initiation of a subsequent conditional handover preparation for the at least one user equipment to the at least one target radio node, the policy being adjusted based on the received cost to enhance the resource utilization of the at least one target radio node.

* * * * *